United States Patent
Dworschack et al.

[15] 3,660,236
[45] May 2, 1972

[54] PRODUCTION OF GLUCOAMYLASE

[72] Inventors: Robert G. Dworschack; Carolyn A. Nelson, both of Clinton, Iowa

[73] Assignee: Standard Brands Incorporated, New York, N.Y.

[22] Filed: Jan. 8, 1969

[21] Appl. No.: 789,964

[52] U.S. Cl. ............................ 195/65, 195/31 R, 195/66 R, 195/118
[51] Int. Cl. ....................................................... C12d 13/10
[58] Field of Search ................ 195/31, 62, 63, 65, 66, 118, 195/124

[56] References Cited

UNITED STATES PATENTS

| | | | |
|---|---|---|---|
| 1,875,368 | 9/1932 | Christensen et al. | 195/118 |
| 1,990,908 | 2/1935 | Krug, Jr. et al. | 195/118 X |
| 3,232,844 | 2/1966 | Kinoshita et al. | 195/118 X |
| 3,298,926 | 1/1967 | Baribo | 195/31 X |

OTHER PUBLICATIONS

Musaeva, T. I., Chemical Abstracts, Vol. 65, 1966 (9393c).

*Primary Examiner*—Lionel M. Shapiro
*Assistant Examiner*—D. M. Naff
*Attorney*—Aaron B. Karas

[57] ABSTRACT

The disclosure is directed to the production of the enzyme glucoamylase. During the growth of glucoamylase producing microorganisms, ammonium hydroxide or ammonia gas is introduced into the growth medium to provide a source of ammonia and to maintain the pH of medium at the level where optimum growth of the microorganisms occurs.

13 Claims, No Drawings

PRODUCTION OF GLUCOAMYLASE

THE INVENTION

This invention relates to the production of glucoamylase.

The principal use of glucoamylase is for converting starch to dextrose. Methods of using glucoamylase in processes for producing dextrose and dextrose containing syrups such as corn syrups are well known in the art. These methods can be grouped into two broad categories. These are the acid-enzyme process and the enzyme-enzyme conversion process. In the acid-enzyme process, starch is first partially hydrolyzed or liquefied, for instance, by forming an aqueous suspension containing about 35 to 40 per cent starch and incorporating therein an acid such as hydrochloric. The suspension is then heated to high temperatures to partially hydrolyze the starch. The suspension may be cooled and treated with a glucoamylase preparation at a suitable concentration and pH range to enzymatically convert the partially hydrolyzed starch to dextrose. The acid-enzyme process is disclosed, for example, in U.S. Pats. Nos. 2,305,168; 2,531,999; 2,893,921, and 3,042,584.

In the enzyme-enzyme conversion process, generally, a starch slurry is formed and a starch liquefying enzyme, for instance bacterial alpha-anylase, added and the starch slurry heated to partially hydrolyze the starch. The partial hydrolysis is usually carried out at a temperature in the range of 80° to 90° C. The D.E. of the slurry after partial hydrolysis may be in the range of from 10 to 20.

Any suitable starch liquefying enzyme may be used to partially hydrolyze the starch. Exemplary of such hydrolyzing enzymes are those produced by members of the *Bacillus subtilis* species, *Aspergillus niger* and other species of the *Aspergillus* genus and by malted cereal grains. The partially hydrolyzed starch slurry may then be treated with a glucoamylase preparation to convert the starch to dextrose.

The enzymatically converted hydrolysates are subjected to various carbon and ion exchange refining procedures well known in the art to remove color bodies, odoriferous materials and constituents which contribute to the ash content of the hydrolysates.

Glucoamylase has been referred to in the art as glucamylase, glucogenic enzyme, starch glucogenase and gama-amylase.

Glucoamylase is elaborated by many types of microorganisms. Certain strains of fungi belonging to the *Aspergillus* group such as strains belonging to the *Aspergillus niger* group and the *Aspergillus awamori* group, certain strains of the *Rhizopus* species and certain stains of the *Endomyces* species will elaborate glucoamylase. Other types of enzymes are also generally elaborated by the above microorganisms, for instance transglucosidase and alpha-amylase. Of particular importance in the use of glucoamylase preparations for converting starch into dextrose are the presence and amounts of transglucosidase and alpha-amylase. Transglucosidase catalyzes the formation, particularly from maltose, of unfermentable dextrose polymers, such as isomaltose and oligosaccharides which contain alpha-D(1 → 6) glucosidic linkages. This is, of course, detrimental to the production of dextrose since lower yields of dextrose are obtained. Alpha-amylase acts on starch to catalyze the formation of saccharides of lower molecular weight such as maltose which may be relatively easily broken down to dextrose by the glucoamylase.

The presence of alpha-amylase is generally not considered detrimental to the production of dextrose and may actually hasten the formation of dextrose; however, it does produce saccharides of the kind which are susceptible of being polymerized to unfermentable dextrose polymers by transglucosidase when relatively large quantities of alpha-amylase are present.

There are many methods known in the art directed to improving glucoamylase preparations. These methods are principally directed to removing or inactivating the transglucosidase present in glucoamylase preparations. Such methods, for example, are disclosed in U.S. Pats. Nos. 3,075,886; 3,117,063; 3,042,584; 2,976,804; and 3,254,003. Another approach which has been taken to improve glucoamylase preparations is mutating the microorganism from which the glucoamylase is elaborated in order to obtain higher yields of glucoamylase and/or lesser amounts of transglucosidase. An example of this approach is described in U.S. Pat. No. 3,012,944.

The production of the glucoamylase preparations is a well known procedure in the fermentation industry. In commercial practice, it is recommended to proceed by stages. These stages may be few or many, depending on the nature of the process and the characteristics of the microorganisms. Ordinarily, propagation is started by inoculating spores from a slant of a culture into a pre-sterilized nutrient medium usually contained in a shaker flask. In the flask, growth of the microorganisms is encouraged by various means, e.g., shaking for aeration and maintenance of suitable temperature. This step or stage is repeated one or more times in flasks or vessels containing the same or larger volumes of nutrient medium. These stages may be conveniently referred to as culture development stages. The microorganisms, with or without accompanying culture medium, from the last development stage, commonly referred to as the seed stage, are introduced or inoculated into a large-scale fermentor to produce commercial quantities of glucoamylase.

Reasons for growing glucoamylase producing microorganisms in stages are manyfold, but are primarily dependent upon the conditions necessary for the growth of the microorganisms and/or the production of glucoamylase. These conditions include stability of the microorganisms, proper nutrients, pH, osmotic relationships, degree of aeration, temperature and the maintenance of pure culture conditions during fermentation. For instance, to obtain maximum yields of glucoamylase, the conditions of fermentation in the final stage may have to be changed somewhat from those practiced to obtain optimum growth of the microorganism in the culture development stages. Maintaining the purity of the medium, also is an extremely important consideration, especially where the fermentation is performed under aerobic conditions. After the fermentation is completed the cellular material may be removed from the enzymes by filtration, centrifugation, etc. The glucoamylase preparation may be used directly to saccharify starch, or concentrated and then used, or purified in accordance with the procedures noted above and then used.

Conventionally, the nutrient medium in the final stage contains as the primary nutrient substances a carbohydrate and a source of nitrogen such as nitrates or proteinaceous materials. More specifically the nutrient medium may contain 15 per cent starch, 2 per cent corn steep liquor (29 Be') (corn steep liquor is the liquor in which corn has been steeped to soften it for a corn wet-milling process and is marketed as a microorganism growth nutrient after a portion of the water contained therein is removed by evaporation) and 1 per cent diammonium phosphate. Sodium hydroxide is generally added to adjust the pH of the nutrient medium to about 4.5 and the medium sterilized. During fermentation, various acid bodies are produced which cause a lowering of the pH of the medium to a range that is detrimental for the production of glucoamylase. Because of this, NaOH is continuously added to the medium during fermentation. The prior art teaches that during the fermentation of glucoamylase producing organisms the pH of the nutrient medium should be maintained in the range of 3.8 to 4.2.

The present invention is based upon the discovery that ammonia gas or ammonium hydroxide may be incorporated into a fermentation medium during the production of glucoamylase in order to maintain the pH in the desirable range. This discovery provides a number of important advantages over prior art processes. For example, it has been found that by using ammonium hydroxide and/or ammonia gas, it is possible to completely eliminate from the growth medium NaOH, the nitrogen salts and part of the corn steep liquor. This not only provides obvious economic benefits but also results in a glucoamylase preparation with lesser quantities of soluble solids present. Consequently, these glucoamylase preparations, when used to convert starch to dextrose, contribute very little to the ash content of the hydrolysate. This provides the advantages that in refining the starch hydrolysate the ion exchange resins used for lowering the ash content may be employed for longer periods of time, the life of the ion exchange resins is increased and the number of regenerations decreased. Furthermore, recovery of the glucoamylase from the nutrient may be achieved very easily and in some cases has been about 70 per cent higher than achieved by conventional processes. Moreover, the glucoamylase preparations prepared by the present process are generally higher in glucoamylase activity and lower in transglucosidase activity. This is, of course, extremely important when the preparation is used for converting starch into dextrose since higher yields of dextrose are obtained.

Generally sufficient ammonia gas and/or ammonium hydroxide should be continuously added to the fermentation medium to maintain the pH thereof in the range of from about 2.5 to about 7, preferably in the range from about 3.5 to about 6.0 and most preferably in the range of from about 5.2 to about 5.7. The preferred microorganism for use in the present process is *Aspergillus awamori* NRRL 3112.

Ammonia gas is the preferred neutralizing agent because of economics involved therewith and the ease with which it may be added to the medium during the fermentation. The ammonia gas may be simply added during the fermentation by injecting it into the pipe which carries the sterile air just before the pipe enters the fermentor.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout this specification, percentages are utilized to refer to per cent by weight, unless otherwise specified.

The analytical procedures and testing methods referred to in this specification were performed by the following procedures:

DETERMINATION OF GLUCOAMYLASE ACTIVITY

Exactly 25 g of soluble starch (Merck Lintner Starch — Special for Diastatic Power Determination) was heated, with stirring, in 700 ml of distilled water until boiling and then held at this temperature for 5 minutes. The starch preparation was cooled to ambient temperature with constant stirring, the pH adjusted to 4.3 ± 0.1 with 20 ml of a 1.0 molar solution of sodium acetate, (pH adjusted to 4.3 with acetic acid) and diluted to 1,000 ml with distilled water. Then 100 ml of this starch substrate was pipetted into a 250 ml Erlenmeyer flask, stoppered and attempered at 60° C. for 15 minutes in a constant temperature water bath. The enzyme preparation was diluted by transferring 50 ml of the preparation to a 2,000 ml volumetric flask and making up to volume. A three-ml aliquot of the diluted enzyme solution was added to the starch substrate, mixed thoroughly, stoppered, and held in a water bath maintained at 60° C. for exactly 1 hour. At the end of 1 hour, 5 ml of a 5 per cent sodium hydroxide solution was added to the flask to terminate the enzyme action. The enzymatically converted hydrolysate was cooled to about 30° C. Ten ml of the hydrolysate was pipetted into a Fehling's titration flask containing 25 ml of boiling Fehling's solution.

The titration with standard dextrose solution was completed using methylene blue as an indicator. A blank determination using 3 ml of distilled water in place of the enzyme preparation was performed in the manner described above. The activity was calculated as follows:

$$\text{Glucoamylase units/g.} = \frac{(B-D)(S)(T)(E)}{(F)(G)(H)(W)}$$

where:

$B$ = ml of standard dextrose solution required for the control.

$D$ = ml of standard dextrose solution required for the enzymatically converted hydrolysate.

$S$ = g of dextrose per ml of standard dextrose solution (0.005).

$T$ = final volume of enzymatically converted hydrolysate (108 ml).

$E$ = volume, ml of diluted enzyme solution (2,000 — except with enzyme preparation of 0 to 3 potency in which the final dilution is 1,000 ml).

$F$ = volume, ml of enzymatically converted hydrolysate titrated with Fehling's solution (10).

$G$ = reaction time in hours (1).

$H$ = volume, ml of diluted enzyme solution added to the substrate-buffer solution (3).

$W$ = weight in g of enzyme preparation used.

DEFINITION OF DEXTROSE EQUIVALENT

The abbreviation, DE, contained herein refers to "dextrose equivalent" and is defined as the reducing sugars expressed as dextrose and calculated as a percentage of the dry substance. The analysis was performed according to Method E–26 in the Standard Analytical Methods of the Member Companies of the Corn Industries Research Foundation.

EXAMPLE I

This Example illustrates the use of ammonia gas in accordance with the method of the present invention for the production of glucoamylase and compares this method with a method of the prior art in which NaOH is used as the neutralizing agent.

A baffled 2,000-gallon fermentor having a sterile air source and impeller agitation means was charged with a pre-sterilized medium containing 800 lbs. corn starch, 15 lbs. $(NH_4)_2PO_4$, 25 gallons corn steep liquor and sufficient water to achieve a volume of about 1,000 gallons. Inoculum of *Aspergillus awamori* NRRL 3112 was inoculated into this fermentor. The temperature of the medium was maintained at 100° F and the aeration rate was 0.5 volume of air/volume of medium/minute. The fermentation was allowed to proceed for about 24 hours.

Inoculum from this stage was inoculated into a 6,000-gallon fermentor having a sterile air source and impeller agitation means. The fermentor was charged with a pre-sterilized medium containing 15 per cent corn starch, 2 per cent corn steep liquor and 1 per cent $(NH_4)_2HPO_4$. The temperature of the medium was maintained at 95° F and aerated at an aeration rate of 0.8 volume of air/volume of medium/minute during the fermentation. The fermentation was allowed to proceed for about 63 hours. During the fermentation the pH of the fermentation medium was maintained in the range of 3.8–4.2 by the addition of a 30 per cent NaOH solution. Four fermentations were carried out in this manner and the glucoamylase activities determined. These activities are shown below in Table I.

Another series of fermentations were carried out in exactly the manner described above but no $(NH_4)_2HPO_4$ was used and the pH of the medium was maintained in the range of 5.5 ± 0.2 by the continuous addition of ammonia gas. Three fermentations were carried out in this manner and the glucoamylase activities determined. These activities are shown below in Table I.

TABLE I

| Sample | Constituents of medium | pH | Neutralizing agent | Glucoamylase activity |
|---|---|---|---|---|
| 1 | 15% corn starch<br>2% corn steep liquor<br>1% $(NH_4)_2HPO_4$ | 3.8–4.2 | NaOH | 162 |
| 2 | 15% corn starch<br>2% corn steep liquor<br>1% $(NH_4)_2HPO_4$ | 3.8–4.2 | NaOH | 152 |
| 3 | 15% corn starch<br>2% corn steep liquor<br>1% $(NH_4)_2HPO_4$ | 3.8–4.2 | NaOH | 148 |

TABLE I – Continued

| Sample | Constituents of medium | pH | Neutralizing agent | Glucoamylase activity |
|---|---|---|---|---|
| 4 | 15% corn starch / 2% corn steep liquor / 1% (NH₄)₂HPO₄ | 3.8-4.2 | NaOH | 163 |
| 5 | 15% corn starch / 2% corn steep liquor | 5.5±0.2 | NH³ gas | 232 |
| 6 | 15% corn starch / 2% corn steep liquor | 5.5±0.2 | NH³ gas | 270 |
| 7 | 15% corn starch / 2% corn steep liquor | 5.5±0.2 | NH³ gas | 278 |

From the above table, it is readily apparent that the use of NH₃ gas in accordance with the method of the present invention greatly enhances the production of glucoamylase.

EXAMPLE II

This Example illustrates the use of glucoamylase preparations prepared in accordance with the method of the present invention as illustrated in the previous Example to convert starch into dextrose.

A suspension of 35 per cent corn starch by weight in water was enzyme liquefied to a dextrose equivalent (D.E.) of about 15. To the liquefied starch was added an amount of glucoamylase preparation to achieve a level of 90 units of glucoamylase activity per pound of starch dry substance. After about 60 hours at 60° C., the hydrolysate was analyzed for D.E. Two series of ten hydrolysates each were prepared in this manner. The glycoamylase preparation used for the first series was prepared in accordance with the present invention by the use of ammonia gas. The other series was prepared with glucoamylase preparations prepared in accordance with procedure illustrated in the previous Example using NaOH as the neutralizing agent.

The D.E. of the hydrolysates are shown below in Table II.

TABLE II

| Fermentation medium used to prepare the glucoamylase preparation | pH of fermentation medium | Neutralizing agent | Dextrose equivalent of hydrolysates* |
|---|---|---|---|
| 15% starch / 2% corn steep liquor / 1% (NH₄)₂HPO₄ | 3.8-4.2 | NaOH | 94.3 |
| 15% starch / 2% corn steep liquor | 5.5±0.2 | NH³ | 95.7 |

*Average of 10 experiments.

From the above Table it is seen that when glucoamylase preparations prepared according to the present invention were used to convert starch into dextrose, greater yields of dextrose were obtained than when glucoamylase preparations prepared according to the prior art were used. This indicates that the glucoamylase preparations prepared according to the present invention contain lesser quantities of transglucosidase.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A process for the production of glucoamylase comprising growing a glucoamylase elaborating microorganism from the Aspergillus group in a fermentation medium in which the pH of the medium is maintained in the range of from about 2.5 to about 7 by the introduction of ammonia gas or ammonium hydroxide into the fermentation medium during the growth of the microorganism.

2. A process for the production of glucoamylase as defined in claim 1, wherein the pH of the medium is maintained in the range of from about 3.5 to about 6.0.

3. A process for the production of glucoamylase as defined in claim 2, wherein the pH of the medium is maintained in the range of from about 5.2 to about 5.7.

4. A process for the production of glucoamylase as defined in claim 3, wherein the glucoamylase elaborating microorganism is *Aspergillus awamori* NRRL 3112.

5. A process for the production of glucoamylase as defined in claim 2, wherein the glucoamylase elaborating microorganism is *Aspergillus awamori* NRRL 3112.

6. A process for converting starch into dextrose comprising growing glucoamylase elaborating microorganisms from the *Aspergillus* group in a fermentation medium maintained in the pH range of from about 2.5 to about 7 by the introduction of ammonia gas or ammonium hydroxide into the medium and treating a liquefied starch slurry with the glucoamylase derived from said fermentation medium under conditions to convert the starch to dextrose.

7. A process for converting starch into dextrose as defined in claim 6, wherein the pH of the fermentation medium is maintained in the range of from about 3.5 to about 6.

8. A process for converting starch into dextrose as defined in claim 7, wherein the pH of the fermentation medium is maintained in the range of from about 5.2 to about 5.7.

9. A process for converting starch into dextrose as defined in claim 6, wherein a starch slurry is treated with a starch liquefying enzyme to obtain the liquefied starch slurry.

10. A process for the production of glucoamylase as defined in claim 2, wherein the pH of the medium is maintained in the range of from about 3.5 to about 6.0 by substantially continuously introducing ammonia gas or ammonium hydroxide into the fermentation medium during the growth of the microorganism.

11. A process for the production of glucoamylase as defined in claim 3, wherein the pH of the medium is maintained in the range of from about 5.2 to about 5.7 by substantially continuously introducing ammonia gas or ammonium hydroxide into the fermentation medium during the growth of the microorganism.

12. A process for converting starch into dextrose as defined in claim 6, wherein the pH of the fermentation medium is maintained in the range of from about 2.5 to about 7.0 by substantially continuously introducing ammonia gas or ammonium hydroxide into the medium.

13. A process for converting starch into dextrose as defined in claim 8, wherein the pH of the fermentation medium is maintained in the range of from about 5.2 to about 5.7 by substantially continuously introducing ammonia gas or ammonium hydroxide into the medium.

* * * * *